Patented Jan. 8, 1935

1,987,317

UNITED STATES PATENT OFFICE 1,987,317

PREPARATION OF ALKYLATED DERIVATIVES OF AMINES

Adolph Zimmerli, New Brunswick, N. J.

No Drawing. Application January 30, 1932
Serial No. 589,975

16 Claims. (Cl. 260—128)

This invention relates to the production of alkylated amines, and it particularly relates to the production of N-monoalkylated derivatives of aromatic compounds, especially such aromatic compounds as contain a plurality of reactive groups.

Although not restricted thereto, the present invention will be particularly described in connection with the production of N-monoalkylated aminophenols of the general type $C_6R_4OH.NHalk$, where R may be hydrogen or any substituting group.

Both the hydroxy and the amino-groups are capable of undergoing reaction with most common alkylating agents and, because of the reactivity of the hydroxy group, many processes which may be ordinarily utilized for the alkylation of amines cannot be used for the N-alkylation of aminophenols. Frequently even in those processes, in which the hydroxy group will not react with the alkylating agent, nevertheless there will be formed a mixture of mono- and di-substituted derivatives and quaternary ammonium salts, while a part of the aminophenol may remain unchanged.

While it is possible in such processes by careful control to favor the formation of the monoalkyl derivative, other alkyl derivatives will also be simultaneously formed and it is found particularly difficult to separate the constituent components of the resulting mixture.

To overcome these difficulties, it has been proposed to combine the aminophenol with formaldehyde and to reduce the resulting compound. It is difficult, however, to carry out the reaction between formaldehyde and aminophenol in molecular partions in a satisfactory manner as there is a tendency to form substantial quantities of by-products, as, for example, the compound of two moles of aminophenol with one mole of formaldehyde. Not only are the yields unsatisfactory, but, in addition, only methyl aminophenols may be produced.

It has also been proposed to combine the aminophenols with aromatic aldehydes, then to methylate the condensation product thus formed, and finally to hydrolyze the addition product with strong hydrochloric acid. While, according to this method, only inappreciable quantities of di-substituted aminophenols are produced, only about 70% of the aminophenol is transformed into the monoalkylated compound, even with an excess of an alkylating agent. Moreover, it is difficult to remove the unchanged aminophenol, and the process is quite disadvantageous in necessitating the utilization of strong hydrochloric acid for hydrolysis.

Among the objects of the present invention is to provide a method by which N-alkylated amino-aromatic derivatives, such as alkylated aminophenols, may be obtained with high yields, practically free from by-products in a most simple and economical manner.

Another object is to produce N-alkylated aminophenols from the corresponding aminophenols by easily controllable reactions with inexpensive and easily procurable reagents, without affecting the hydroxy group, without forming a final reaction product which must be extensively purified to remove unaffected aminophenol and/or large quantities of undesirable by-products, such as the di- or other poly-alkylated derivatives and quaternary ammonium salts, and without the necessity of utilizing strong hydrochloric acid as a hydrolyzing agent.

It has been found that the objects of the present invention may be conveniently accomplished by alkylating compounds or condensation products of aminophenol and other amino-aromatic derivatives with aldehydes of less activity than formaldehyde and of substantially higher molecular weight than formaldehyde, which are not of the aromatic series. When such aldehyde-amine compounds are treated with alkylating agents, addition products are formed which, upon treatment with water, are readily transformed into salts of the desired N-alkylated compounds from which the free bases may be readily liberated with alkalies.

In a preferred form of the invention, p-aminophenol may be combined with furfuraldehyde and the resulting compound may then be treated with a suitable alkylating agent, such as methyl iodide, ethyl bromide, di-methyl sulphate, propyl para-toluene sulphonate, and so forth. The resulting addition product may be readily converted into a salt of the desired N-substituted aminophenol upon treatment with even as weak a hydrolyzing agent as cold water.

As one specific example of one manner of carrying out the present invention, p-aminophenol is condensed with furfural by heating a molecular mixture of the two substances in the presence of water. About 187 parts of the resultant dry and finely ground condensation product are suspended in a mixture of about 140 parts of neutral di-methyl sulphate and about 1000 parts of dry chlorbenzol, all parts being by weight. This mixture is stirred at about 60° C. for about two hours.

The condensation product of aminophenol with furfural, upon combination with di-methyl sulphate, becomes slightly darker. The addition product, which is in the form of a crystalline powder insoluble in chlorbenzol, is filtered. It is then dissolved in about 1000 parts of cold water. The water solution is made alkaline with a mixture of about 95% sodium carbonate and 5% of sodium sulphite, and the free N-mono-methylp-aminophenol is extracted with ether together with the liberated furfural.

After evaporation of the ether and distillation of the furfural, the resulting composition is distilled under a vacuum in a stream of carbon dioxide. The yield is almost quantitative. As the base readily combines with oxygen with the formation of undesirable dark colored products, it is desirable that it be purified and stored in the absence of air.

The probable course of the reactions is represented by the following equations:

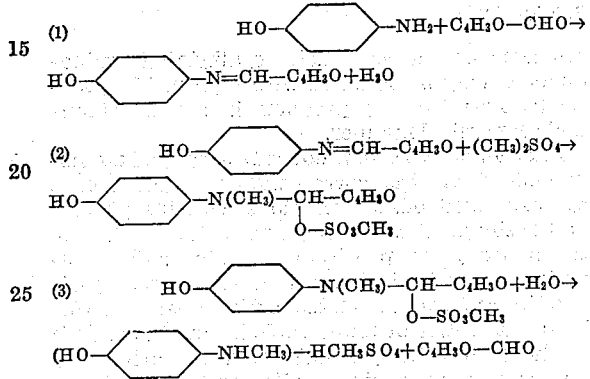

As another example of another manner of carrying out the invention, 237 parts of the condensation product of 1-amino-2-naphthol with furfuraldehyde are suspended in 600 parts of dry benzene and the suspension is heated to boiling. Then 210 parts of ethyl-para-toluene-sulphonate are dissolved in 600 parts of benzene and the solution is added slowly to the suspension during the course of 3 hours, with intensive stirring and refluxing.

The reaction mixture is then cooled; 1000 parts of cold water are added; and after the hydrolysis is complete, the benzene and furfural are distilled with steam. The residue is heated to 100° C. and the free acid therein is neutralized with barium hydroxide.

After filtration, to remove the barium sulphate the mother liquor, on concentration and cooling, will yield crystals of 1-ethylamino-2-naphthol sulphate, from which the free base may be readily isolated.

While the above examples give preferred methods of carrying out the process, they may be modified in different ways without departing from the spirit of the invention. For example, under suitable conditions other amino derivatives than aminophenol may be employed, particularly of aromatic compounds having other reactive groups in addition to, or in place of, the hydroxy group. Instead of employing an aminophenol derivative having a six-membered or benzene ring nucleus or naphthalene ring nucleus, other compounds having different or more complicated aromatic rings may be employed. Instead of furfural, other aldehydes having less activity than formaldehyde and of a non-aromatic nature may be utilized.

Under suitable conditions other anhydrous organic liquids, which will not react with any of the compounds utilized or formed in the reaction, may be employed in addition or in substitution for chlorbenzene or benzene. The organic liquid may even be a solvent for the condensation product of furfural and aminophenol, as is the case with nitrobenzene. The temperature and time of the reaction may be considerably varied, but at lower temperatures the action proceeds more slowly and below 50° C. it is too slow for commercial purposes. Higher temperatures up to the boiling point of chlorbenzene are entirely suitable. However, when the time of reaction is considerably shortened by higher temperature, there is a tendency to form undesirable colored by-products.

Instead of separating the desired products of the reaction by filtration, water may be added and the solvent and furfural distilled with steam.

For the removal of the base from its water solution, other organic solvents than ether may be utilized and the resulting base may be precipitated from its solution in an organic solvent as a salt by acids, instead of removing said solvent by distillation.

The process of the present invention is particularly advantageous inasmuch as furfural is available in unlimited quantities at low cost, while the condensation product between furfural and aminophenol may be readily formed as described above by adding the two materials in water.

The readiness with which the addition product of the alkylating agent and the aldehyde-amine condensation product undergoes hydrolysis, even with cold water, is particularly surprising in view of the fact that it is necessary to boil the addition product of benzylidene-aminophenol (i. e. the condensation product of benzaldehyde and aminophenol) with di-methyl sulphate, with hydrochloric acid for its hydrolysis.

Moreover, not only is an almost quantitative yield of N-mono-substituted aminophenol obtained, but, in addition, the furfural is substantially quantitatively recovered and may again be utilized to combine with the aminophenol.

What is claimed is:

1. The process of preparing N-mono-alkyl amino-hydroxy-benzene derivatives, which comprises treating a condensation product of a heterocyclic water-soluble, readily-vaporizable aldehyde of less reactivity and higher molecular weight than formaldehyde and of non-aromatic properties and an amino-hydroxy-benzene compound with an alkylating agent, and then hydrolyzing the alkyl group of said derivative and the alkylating agent serving to introduce an alkyl group selected from the class consisting of the methyl group, the ethyl group and the propyl group.

2. The process of preparing N-mono-alkyl amino-hydroxy naphthalene derivatives, which comprises treating a condensation product of furfural and the naphthalene derivative with an alkylating agent, and then hydrolyzing the alkyl group of said derivative and the alkylating agent serving to introduce an alkyl group selected from the class consisting of the methyl group, the ethyl group and the propyl group.

3. The process of producing N-monoalkyl derivatives of aminophenols, which comprises treating the furfural-aminophenol condensation compounds with alkylating agents which will form addition products therewith, and treating the addition product with water, the alkyl group of said derivative being a lower alkyl radical and the alkylating agent serving to introduce a lower alkyl radical.

4. The process of producing N-monoalkyl derivatives of aminophenols, which comprises treating the furfural-aminophenol condensation compounds with alkylating agents which will form addition products therewith, hydrolyzing the addition product with water, and liberating the alkylated base with an alkali, the alkyl group of said derivative being a lower alkyl radical and the alkylating agent serving to introduce a lower alkyl radical.

5. The process of producing N-monomethyl derivatives of aminophenols, which comprises treating furfural-aminophenol compounds with di-methyl sulphate, and hydrolyzing the addition product with water.

6. The process of producing N-monomethyl derivatives of aminophenols, which comprises reacting furfural-aminophenol condensation compounds with di-methyl sulphate, hydrolyzing the addition product with water, and liberating the methylated base with an alkali metal carbonate.

7. The process of producing N-monomethyl derivatives of aminophenols, which comprises treating furfural-aminophenol compounds suspended in an inert organic liquid with di-methyl sulphate, and hydrolyzing the addition product with water.

8. The process of producing N-monomethyl derivatives of aminophenols, which comprises reacting furfural-aminophenol compounds suspended in an inert organic liquid with di-methyl sulphate at about 50 to about 130° C. from about 2 to about 6 hours, filtering the addition product, and treating it with water.

9. The process of producing N-monomethyl derivatives of aminophenols, which comprises reacting about 187 parts of a furfural-aminophenol compound in about 1000 parts of chlorbenzol with about 140 parts of di-methyl sulphate at about 60° C. for about 2 hours, filtering the addition product, and treating it with an aqueous solution of sodium carbonate.

10. The process of preparing compounds having the following general formula

where $R_1$ represents hydrogen, $R_2$ represents methyl, ethyl or propyl group, where $R_3$ represents a benzene or a naphthalene nucleus, which comprises forming a condensation product of an aldehyde having the general formula $$R_4CHO$$

where $R_4$ represents a furane ring, and an amino compound having the general formula

where $R_5$ represents either a benzene or a naphthalene ring and where the hydroxyl is either in two or four position with respect to the amino group, then treating the resultant condensation product with an alkylating agent selected from the group of alkylating agents consisting of methyl iodide, ethyl bromide, di-methyl sulphate, ethyl paratoluene sulphate and propyl paratoluene sulphonate, and then finally hydrolyzing.

11. A process of preparing N-monomethyl amino-parahydroxy benzene which comprises reacting together para-aminophenol with furfural to form a condensation product, treating this condensation product with dimethyl sulphate and then hydrolyzing.

12. The process of preparing 1-(N-ethylamino)-2-naphthol sulphate which comprises condensing together 1-amino-2-naphthol with furfural, treating the condensation product with ethyl-para-toluene-sulphonate and then hydrolyzing.

13. The process of preparing 1-(N-ethylamino)-2-naphthol which comprises suspending about 237 parts of the condensation product of 1-amino-2-naphthol and furfural in about 600 parts of dry benzene, heating the suspension to boiling, dissolving about 210 parts of ethyl-para-toluene sulphonate in about 600 parts of benzene, slowly adding this last solution to the suspension during the course of three hours with stirring and refluxing, cooling the reaction mixture, adding about 1000 parts of cold water, permitting the mixture to stand until the hydrolysis is complete, distilling off the benzene and furfural with steam, heating the residue to about 100° C. and neutralizing the free acid with barium hydroxide, filtering to remove the barium sulphate and then concentrating and cooling.

14. The process, which comprises treating a condensation product having the general formula:

$$HO-R_6-N=CH-R_7$$

where $R_6$ is a benzene or naphthalene ring and where $R_7$ is a furane ring and when the hydroxyl is in 2 or 4 position with respect to the nitrogen group with a lower alkylating agent and then hydrolyzing.

15. The process, which comprises treating a condensation product having the formula $$HO-C_6H_4-N=CH-C_4H_3O$$

with a methylating agent and then hydrolyzing.

16. The process which comprises treating the compound having the formula $$HO-C_{10}H_6-N=CH-C_4H_3O$$

with an ethylating agent and then hydrolyzing.

ADOLPH ZIMMERLI.